United States Patent [19]

Palmer

[11] 4,383,088

[45] May 10, 1983

[54] ORGANIC POLYMER LAYERED DICHALCOGENIDES

[75] Inventor: David N. Palmer, Tolland, Conn.

[73] Assignee: Combustion Engineering, Inc., Windsor, Conn.

[21] Appl. No.: 345,604

[22] Filed: Feb. 4, 1982

[51] Int. Cl.$^3$ .............................. C08F 8/26; C08F 8/42
[52] U.S. Cl. .............................. 525/274; 525/332.2; 525/354; 525/359.1; 525/367; 525/368
[58] Field of Search .................. 521/29, 31, 53, 55; 525/357, 359.1, 354, 367, 368, 332, 274

[56] References Cited

U.S. PATENT DOCUMENTS 4,230,633  10/1980  Vollhardt .............................. 521/53
4,276,395   6/1981  Vollhardt .............................. 525/357

OTHER PUBLICATIONS

Bonds et al., Jour. Am. Chem. Soc., 97:8, pp. 2128–2132, Apr. 16, 1975.

Primary Examiner—Paul R. Michl
Attorney, Agent, or Firm—Brumbaugh, Graves, Donohue & Raymond

[57] ABSTRACT

Organic polymer layered dichalcogenides, such as a transition metal metallocene dichalcogenide-substituted styrene divinylbenzene copolymer, are useful as the cathode active material for lithium nonaqueous secondary batteries which operate on the principle of intercalation and elsewhere.

7 Claims, No Drawings

ORGANIC POLYMER LAYERED DICHALCOGENIDES

The present invention relates to a process for producing organic polymer layered or lamellar dichalcogenides and the organic polymer layered dichalcogenides produced thereby.

Transition metal layered chalcogenides are well known to be useful as the cathode active material for lithium nonaqueous secondary batteries which operate upon the principle of intercalation. Typical examples of such materials and such batteries are those disclosed, for example, in U.S. Pat. Nos. 4,009,052; 4,049,879; 4,049,887; 4,198,476; 4,206,276; 4,207,245; 4,228,226; and 4,233,377.

The object of the present invention is to provide alternative cathode active materials useful in such batteries and elsewhere and a process for their preparation.

Bonds et al in Jour. Am. Chem. Soc., 97:8, pp. 2128-2132 (Apr. 16, 1975) discloses that a styrene divinylbenzene copolymer can be converted into a dicyclopentadienyl transition metal dichloride-substituted styrene divinylbenzene copolymer by the sequence of the four steps (a) through (d) set forth below.

Thus, a macrorecticular styrene divinylbenzene (1–20%) copolymer (100–900 Å pore) is reacted with freshly distilled chloromethyl ethyl ether to form a chloromethylated styrene divinylbenzene copolymer. The reaction can be conducted at room temperature (about 25° C.) for about 72 hours in the presence of stannic chloride ($SnCl_4$). This reaction can be represented by the following schematic equation wherein

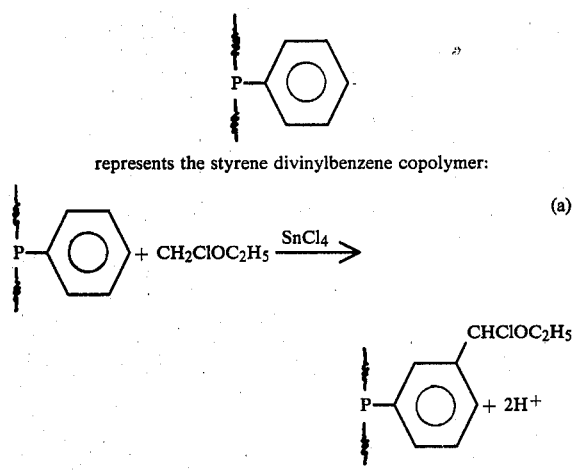

represents the styrene divinylbenzene copolymer:

(a)

The chloromethylated styrene divinylbenzene copolymer is reacted with an excess of about 2 M cyclopentadienyl sodium to form a cyclopentadienyl-substituted styrene divinylbenzene copolymer. The reaction can be conducted at room temperature for about 5 days in a dry, air-free tetrahydrofuran medium. This reaction can be represented by the following schematic equation:

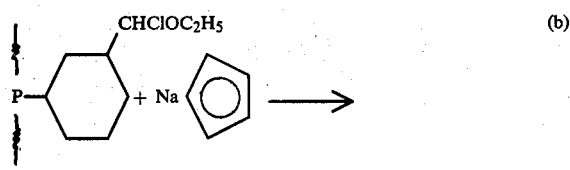

(b)

The cyclopentadienyl-substituted styrene divinylbenzene copolymer is reacted with about 2 M methyl lithium to form a lithiated cyclopentadienyl-substituted styrene divinylbenzene copolymer. The reaction can be conducted in a tetrahydrofuran/diethyl ether medium under an inert (argon) atmosphere at about 25° C. for about 2–3 days. This reaction can be represented by the following schematic equation:

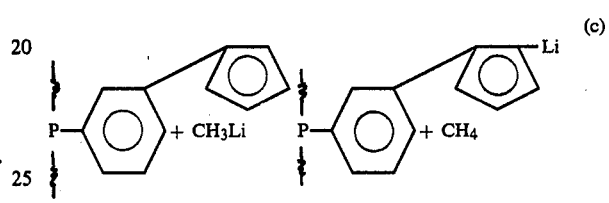

(c)

The lithiated cyclopentadienyl-substituted styrene divinylbenzene copolymer is reacted with an excess of cyclopentadienyl transition metal (e.g., titanium) trichloride to form a dicyclopentadienyl transition metal (e.g., titanium) dichloride-substituted styrene divinylbenzene copolymer. The reaction can be conducted in a dry benzene medium at about 25° C. for about 3 days. This reaction can be represented by the following schematic equation:

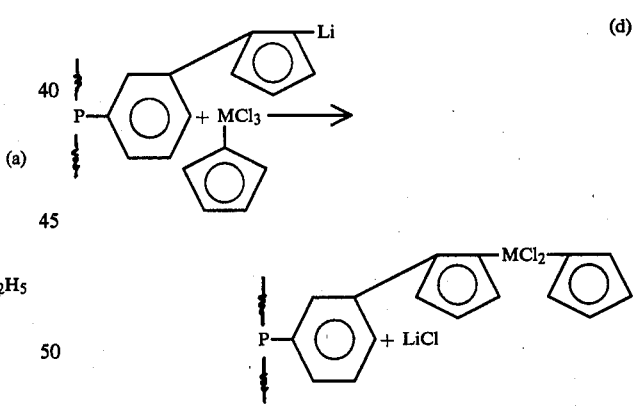

(d)

In accordance with the process of the present invention, the dicyclopentadienyl transition metal dichloride-substituted styrene divinylbenzene copolymer is reacted with a chalcogenide compound selected from the group consisting of a lithium chalcogenide ($Li_2X$) and a chalcogenide-bearing acid ($H_2X$) to form a dicyclopentadienyl transition metal dichalcogenide-substituted styrene divinylbenzene copolymer. The reaction can be conducted in an appropriate dry, oxygen-free medium, such as carbon disulfide, dioxolane, dioxane or tetrahydrofuran, at a temperature of about 25° C. for about 48 hours. The reaction is conducted in the presence of excess chloride ions when using a lithium chalcogenide reactant. This reaction can be represented by the following schematic equation:

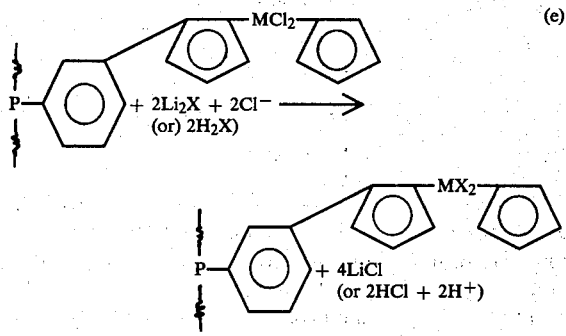

The transition metals (M) mentioned above are the metals of Groups 1b to 7b and 8 of the Periodic Table of Elements and include, for example, titanium, vanadium, tantalum, chromium, cobalt, nickel, manganese, niobium, ruthenium, molybdenum, hafnium, zirconium, and tungsten. The above-mentioned lithium chalcogenides ($Li_2X$) include, for example, lithium oxide ($Li_2O$), lithium sulfide ($Li_2S$), lithium selenide ($Li_2Se$) and lithium telluride ($Li_2Te$), and can further contain phosphorus or a halide (bromine, chlorine, iodine). The chalcogenide-bearing acids ($H_2X$) mentioned above include, for example, hydrogen sulfide ($H_2S$), hydrogen selenide ($H_2Se$) and hydrogen telluride ($H_2Te$).

The organic polymer layered dichalcogenides of the present invention are transition metal metallocene dichalcogenide-substituted styrene divinylbenzene copolymers, e.g., titanocene disulfide-substituted styrene divinylbenzene copolymer and vanadocene diselenide-substituted styrene divinylbenzene copolymer.

The compounds of the present invention are useful as the cathode active material for lithium nonaqueous secondary batteries which operate on the principle of intercalation. They can also be used as photogalvanic electrodes for the galvanocatalytic production of hydrogen and oxygen from aqueous electrolytes or production of methane and oxygen from alcoholic electrolytes. In addition they are useful as reforming catalysts for fuel cells, as general petrochemical catalysts or as cathode active material for primary batteries.

The process and products of the present invention are illustrated by the following representative examples thereof.

EXAMPLE 1

400 g. of macroreticular styrene divinylbenzene (20%) copolymer (600 A pore) beads were mixed with 250 ml. of freshly distilled water- and oxygen-free chloromethyl ethyl ether and reacted in the presence of 70 ml. of stannic chloride (premixed at 0° C. with chloromethyl ethyl ether) for about 72 hours at about 25° C. 55 g. of a chloromethylated styrene divinylbenzene copolymer were recovered.

55 g. of the chloromethylated styrene divinylbenzene copolymer were mixed with 500 ml. of 2 M cyclopentadienyl sodium and reacted at room temperature for 5 days in a dry, air-free tetrahydrofuran medium. 40 g. of a cyclopentadienyl-substituted styrene divinylbenzene copolymer were recovered.

40 g of the cyclopentadienyl-substituted styrene divinylbenzene copolymer were mixed with 100 ml. of 2.25 M methyl lithium and reacted in a dry, oxygen-free tetrahydrofuran/diethyl ether medium under an argon environment for about 72 hours at about 25° C. 20 g. of a lithiated cyclopentadienyl-substituted styrene divinylbenzene copolymer were recovered.

20 g. of the lithiated cyclopentadienyl-substituted styrene divinylbenzene copolymer were mixed with 40 g. of cyclopentadienyl titanium trichloride (titanocene trichloride) dissolved in 350 ml. of dry benzene and reacted in the benzene medium for about 3 days at about 25° C. under argon. 50 g. of dicyclopentadienyl titanium dichloride-substituted styrene divinylbenzene copolymer (titanocene dichloride-substituted styrene divinylbenzene copolymer) were recovered.

50 g. of the dicyclopentadienyl titanium dichloride-substituted styrene divinylbenzene copolymer (titanocene dichloride-substituted styrene divinylbenzene copolymer) were mixed with 10 g. of lithium sulfide dissolved in water- and oxygen-free tetrahydrofuran and reacted for about 48 hours at 25° C. in the presence of excess chloride ions under argon. 50 g. of a dicyclopentadienyl titanium disulfide-substituted styrene divinylbenzene copolymer (titanocene disulfide-substituted styrene divinylbenzene copolymer) were recovered by slow precipitation or rising to the surface of the reaction medium and visual segregation by color.

EXAMPLE 2

50 g. of the lithiated cyclopentadienyl-substituted styrene divinylbenzene copolymer as produced in Example 1 were mixed with 115 g. of cyclopentadienyl vanadium trichloride (vanadocene trichloride) dissolved in 1 liter of dry benzene and reacted in the benzene medium for about 3 days at about 25° C. under argon. 130 g. of a dicyclopentadienyl vanadium dichloride-substituted styrene divinylbenzene copolymer (vanadocene dichloride-substituted styrene divinylbenzene copolymer) were recovered.

50 g. of the dicyclopentadienyl vanadium dichloride-substituted styrene divinylbenzene copolymer (vanadocene dichloride-substituted styrene divinylbenzene copolymer) were mixed with 19 g. of hydrogen selenide dissolved in dry, oxygen-free tetrahydrofuran/dioxolane and reacted for about 48 hours at 25° C. under argon. 85 g. of a dicyclopentadienyl vanadium diselenide-substituted styrene divinylbenzene copolymer (vanadocene diselenide-substituted styrene divinylbenzene copolymer) were recovered by slow precipitation or rising to the surface of the reaction medium and visual segregation by color.

What is claimed is:

1. A process for the preparation of an organic polymer layered dichalcogenide which comprises:
   reacting a dicyclopentadienyl transition metal dichloride-substituted styrene divinylbenzene copolymer with a chalcogenide compound selected from the group consisting of a lithium chalcogenide and a chalcogenide-bearing acid to form a dicyclopentadienyl transition metal dichalocogenide-substituted styrene divinylbenzene copolymer.

2. The process as defined by claim 1 wherein the transition metal is titanium and the chalcogenide compound is lithium sulfide.

3. The process as defined by claim 1 wherein the transition metal is vanadium and the chalcogenide compound is hydrogen selenide.

4. An organic polymer layered dichlalcogenide produced by the process of claim 1.

5. An organic polymer layered dichalcogenide which is a transition metal metallocene dichalcogenide-substituted styrene divinylbenzene copolymer.

6. An organic polymer layered dichalcogenide as defined by claim 5 which is titanocene disulfide-substituted styrene divinylbenzene copolymer.

7. An organic polymer layered dichalcogenide as defined by claim 5 which is vanadocene diselenide-substituted styrene divinylbenzene copolymer.

* * * * *